July 27, 1948.                    M. PARTIOT                    2,445,801
            METHOD OF ELECTRIC RESISTANCE WELDING
                 LAMINATED SHEET METAL STRUCTURES
Filed Aug. 6, 1942                                    2 Sheets-Sheet 1
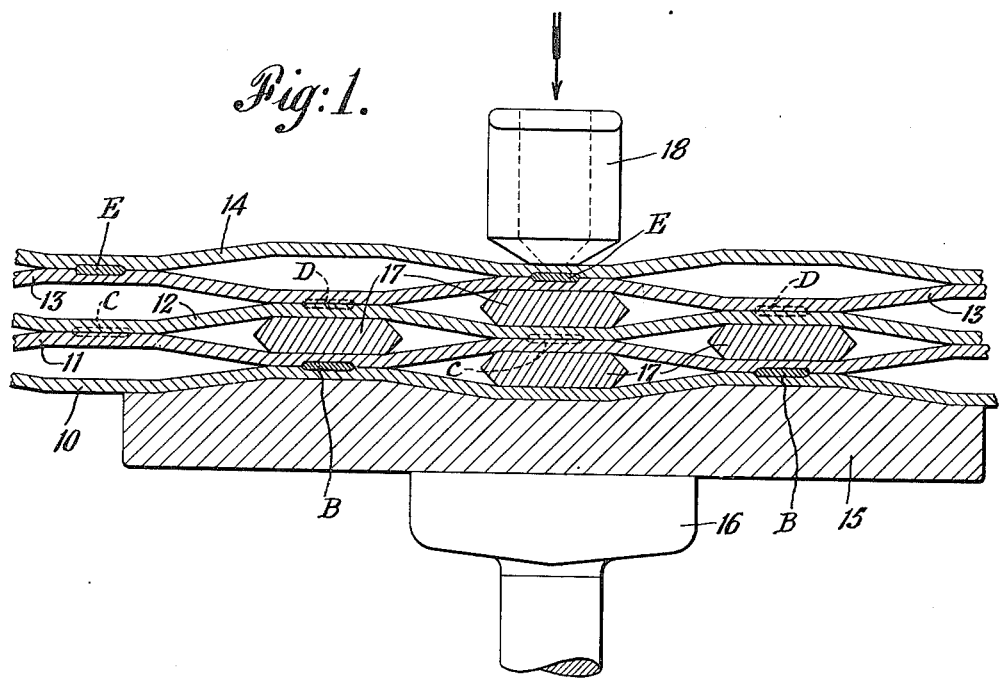
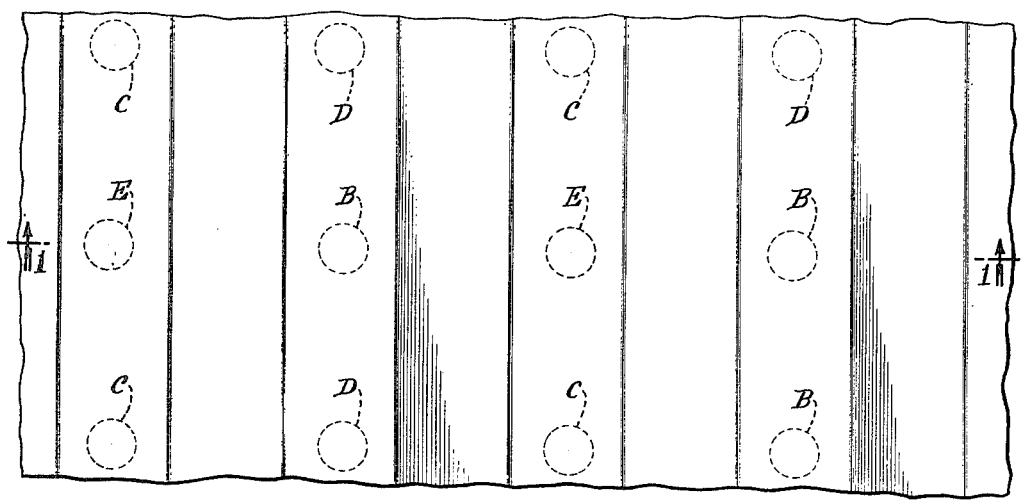
INVENTOR
MAURICE PARTIOT
BY
Haquet, Reay & Campbell
his ATTORNEYS.

July 27, 1948.   M. PARTIOT   2,445,801
METHOD OF ELECTRIC RESISTANCE WELDING
LAMINATED SHEET METAL STRUCTURES
Filed Aug. 6, 1942   2 Sheets-Sheet 2

INVENTOR
MAURICE PARTIOT
BY
his ATTORNEYS

Patented July 27, 1948

2,445,801

UNITED STATES PATENT OFFICE 2,445,801

METHOD OF ELECTRIC RESISTANCE WELDING A LAMINATED SHEET METAL STRUCTURE

Maurice Partiot, Noroton, Conn., assignor to The Nitralloy Corporation, a corporation of Delaware Application August 6, 1942, Serial No. 453,913

2 Claims. (Cl. 219—10)

This invention relates to an improved method of electric resistance welding a laminated sheet metal structure wherein the welds between each adjacent pair of sheets are disposed in spaced relation to and out of alignment with the welds joining each sheet of the pair to other adjacent sheets of the laminated structure. The invention may be applied in producing laminated sheet metal structures for various purposes, but will be described hereinafter with particular reference to the manufacture of laminated structures adapted to resist impacts and to distribute the force of localized impacts over a considerable area of the structure without bringing about permanent deformation.

The invention has for an object to provide an improved method of making a laminated sheet metal structure in which the various laminae are secured to each other in such a way that localized zones of weakness are largely if not completely eliminated and the overall resiliency of the structure is considerably improved.

Another object of the invention is to provide an improved method of assembling and welding together the constituent parts of such a laminated sheet metal structure.

A still further object is to provide a method whereby a laminated sheet metal structure is built up by welding a plurality of metal sheets together at spaced points with slightly corrugated or bowed sections between the welds which provide interstices.

Still another object of my invention is to provide a method whereby it is made possible to produce a built-up or laminated sheet metal structure comprising at least three sheets or relatively thin plates joined together at spaced points by welding and in which the welds joining any two sheets together are in index staggered relation to the welds joining any other two sheets of the structure.

Other objects of the invention will become apparent from the following description:

In accordance with the present invention, I have provided a method of utilizing the electrical resistance welding process to form a laminated sheet metal structure which is made up of a plurality of relatively thin sheets or plates of metal in which the sheets are so assembled and secured by welding that none of the zones or areas at which the sheets are secured to each other are in alignment in a direction normal to the surface of the structure. Preferably the sheets are secured to each other with the welds arranged in index spaced relation. By "index spaced relation" is meant that the welds are so spaced apart that no two or more of them are in alignment in a direction normal to the surface of the assembled plate structure.

According to one advantageous and preferred modification, either during the formation of the individual sheets or during the welding operation, at least certain of the sheets are bowed slightly between the welds so that they possess increased capacity for springing under impacts and thereby dissipate at least a part of the energy of the impact, as, for example, the impact of a projectile when the structure is used as armor plate. An additional feature of my invention consists in so controlling the depths of the spaces between the sheets as to insure that each sheet or plate shall be free to undergo considerable flexure under impact but at the same time will be brought into supporting contact with the next succeeding sheet before its elastic limit is exceeded.

For a better understanding of the invention, reference may be had to the accompanying drawing in which:

Figure 1 is a view in vertical cross section on the line 1—1 of Figure 2 of a portion of a laminated sheet metal structure during the process of assembly illustrating also the electrodes by means of which the sheets are welded together;

Figure 2 is a top plan view of a portion of the laminated structure illustrating the manner in which the welds are disposed in staggered relation to each other;

Figure 3:
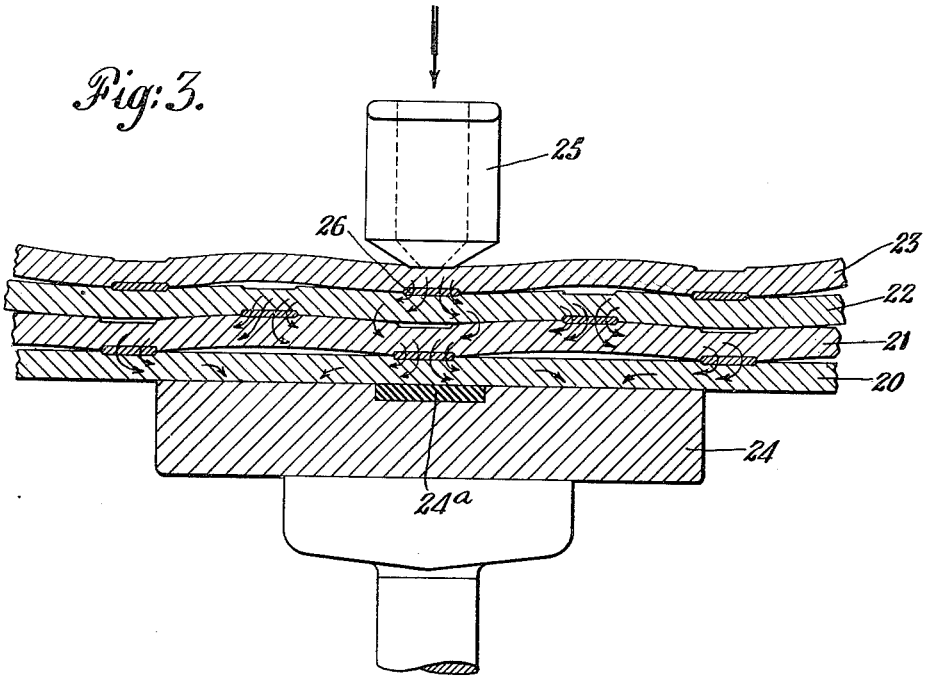
Figure 3 is a view in part vertical section and in part side elevation of a modified form of laminated structure in the process of being assembled by a modified method of welding the sheets together.

As shown in Figure 1 of the drawings, the method is applied to the production of a laminated structure formed of a plurality of sheets of steel 10, 11, 12, 13 and 14 which are pre-formed to render them corrugated on lines extending across the sheets. When these sheets are stacked one upon the other, as illustrated in Figure 1, the resulting structure will have a generally honeycombed cross-sectional shape with spaces between the sheets at certain zones and other portions of the sheets in contact with each other.

In order to assemble and weld the various sheets together, conventional types of water-cooled welding electrodes may be used in producing the welded joints between the sheets 10 and 11 at the points indicated, for example, by the letter "B." All of the welds B between the sheets 10 and 11 may be in the same straight line extending, for example, laterally of the sheet, or they may be alternately at a small distance to the right or left of the center line of the mandrels as shown in Figure 2.

In order to assemble the remaining sheets forming the laminated structure I resort to a novel method of controlled welding in order to space the welds properly one from the other in index spaced relation and in order to exert the proper welding pressure on the sheets. It is well known that when spot welding electrodes of similar surface contact area are positioned in alignment on opposite sides of a metal structure to be welded and a suitable current flow is established, welds will be formed directly in alignment with the electrodes between each adjoining pair of sheets disposed between the electrodes. In order to avoid this action and to confine the welds to an index staggered relation, I have provided an enlarged lower electrode plate 15 which rests upon the lower welding electrode 16 and is shaped to fit the contours of the lower sheet or plate 10. In this way the electric current is distributed over a wide area of the lower sheet 10 and the adjacent sheet 11.

In order to concentrate the electrical energy within a more restricted area at the points where the welds are to be formed between sheets 11 and 12 and to insure that a proper welding pressure may be applied at the weld zones, a mandrel 17, formed of copper or other highly conductive metal, is placed between the sheets 10 and 11. This mandrel supports the sheet 11 so that a proper welding pressure can be applied thereto. When the sheet 12 is placed upon the sheet 11 and the top electrode 18 is brought into contact with the sheet 12 in opposed relation to the mandrel 17 and a welding current is passed, the weld C is formed in alignment with the tip of the electrode 18, but the metal is not fused below the mandrel 17 because of the distribution of the current throughout the area of the mandrel 17. After one weld C has been formed the electrodes and mandrel C may be shifted longitudinally to form the next succeeding weld C or if desired a plurality of sets of electrodes 16 and 18, electrode plates 15 and mandrels 17 may be used simultaneously to form all or a predetermined number of the welds C.

After the series of welds C have been formed and the sheet 12 has been secured at all the desired spots to the sheet 11, the sheet 13 may then be placed on top of the sheet 12 and mandrels 17 placed in the proper locations between the sheets 11 and 12 to support the sheets and distribute the current as described above. The electrodes 16 and 18 and the electrode plates 15 then may be shifted relatively to the welds B and C to positions that will insure that welds D between the sheets 12 and 13 will lie in a different vertical plane than the welds B, referred to above, and as shown particularly in Figure 2 of the drawings. The sheets 12 and 13 then are secured together by a series of welds D which are spaced in staggered relation to and on different lines from any of the welds B and C.

If still another sheet 14 is to be assembled into the laminated structure a series of mandrels 17 will be inserted in the series of enlarged spaces between the sheets 12 and 13. Preferably the mandrels in line therewith between the sheets 10 and 11 will be allowed to remain in place so as to insure firm supports for the superposed mandrels and permit of the application of a proper welding pressure. If desired, the mandrels 17 positioned between sheets 11 and 12 may be permitted to remain in place during the welding of the sheet 14 to the sheet 13. As is the case when preparing to form the welds D, the electrodes and electrode plates will be shifted laterally to insure that the welds E between the sheets 13 and 14 will be staggered or out of line laterally with the welds C between sheets 11 and 12.

The assembly of the various sheets can continue until the desired thickness is built up in accordance with the requirements for the service to which the laminated structure is to be put.

When the assembly is finished, the intermediary mandrels are removed and the plate assembly may be pressed back to a total thickness which is predetermined by ballistic or other suitable impact tests to be the best one for the intended service. In general the spacing of the individual sheets or plates at the end of the pressing operation should be such that each sheet may be considerably flexed on application of pressure at a point on the surface thereof intermediate the welds connecting it with an adjacent sheet and yet such portion of the sheet may be forced into contact with such adjacent sheet before the elastic limit of the metal making up such portion has been reached. The dimensions of the mandrels will be so determined with respect to the interstitial spaces that are to be retained in the final plate as to keep as low as possible the stresses that are set up in the flattening step. It has been found that mandrels of a ⅜" thickness and a width of 1¼" work very well for a spacing of about 5 inches between center lines of the welds when sheets of from .04" to .08" are being used to form the laminated structure.

Figure 4:
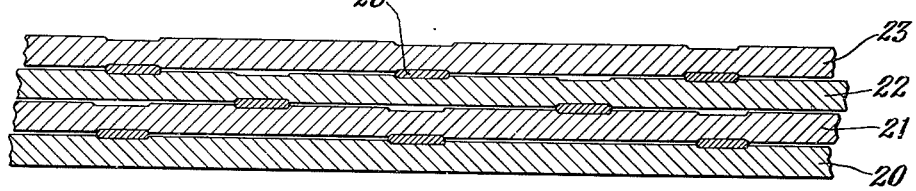
Figure 4 is a view in side elevation of the laminated structure of Figure 3 after the welding electrodes and welding pressure have been removed.

When relatively rigid sheets or plates are used, as for example, when they are more than 0.125" thick it will usually be more convenient to substitute, for the method above described and shown in Figure 1, the method illustrated in Figures 3 and 4 wherein the laminated structure may be formed from initially flat sheets or plates of metal and the sheets bowed slightly during the welding operation. As shown in Figure 3, the laminated structure may be formed of four sheets of metal 20, 21, 22 and 23. In assembling these sheets, the sheets 20 and 21 may be placed on top of each other and supported on a lower electrode 24 of considerably greater area than the area of the upper electrode 25. The electrodes 24 and 25 preferably are watercooled and can be forced together under high pressure so that during the welding operation deep dimples are formed in the surfaces of the sheets and the metal is forced to flow so that the sheets 20 and 21 are bowed between the welds. In order to secure the remaining sheets 22 and 23 together and to the sheet 21, the bottom electrode 24 may be provided with an insulated portion 24a in alignment with the top electrode 25 and slightly depressed with respect to the face of the electrode. The insulated portion prevents current from passing in a straight line normal to the surfaces of the sheets between the electrodes. With this arrangement a weld will be formed only at the point of contact of the two plates immediately beneath and adjacent the electrode 25 as at 26 and not at the place where the insulated portion 24a engages the sheet 20. The paths taken by the current in passing between the electrodes is shown by the arrows in Figure 3. In this form of laminated structure the welds are staggered as in the form shown in Figures 1 and 2 so that no two of these welds are in alignment normal to the surface of the plate. When employing the method of Figure 3, it is advisable to increase the number of welds by spacing them closer together and in this way insure a sufficiently low resistance to flow of current to permit of staggered welding instead of welding in a straight line. On release of the welding pressure the sheets will lose some of the bowed shape between the welds and assume a spacing such as shown in Figure 4. Interstitial spacing that will leave a distance of from .02 to .06" between sheets may be produced with suitable regulation of the welding pressure and according to the thickness of the sheets.

Figure 5:
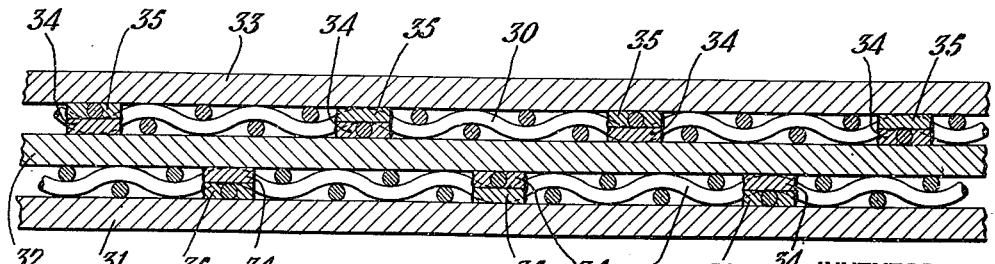
Figure 5 is a view in cross section of another type of laminated structure formed by the welding method of the present invention.

The welding operation can be facilitated further by providing relatively rigid spacers between the sheets so that adequate welding pressures can be obtained between the various sheets. As illustrated in Figure 5, the spacers may take the form of a sheet of wire mesh 30 interposed between each of the sheets 31, 32 and 33. The pressure of the welding electrodes is resisted by the sheets and the wire mesh and welds 34 will be formed at the intersection of the wires where they are disposed beneath the smaller or upper welding electrode shown in Figures 1 and 3. If desired, the wire mesh 30 may be provided with metal disks 35 at the intersection of certain of the wires and at the welding zones to fuse with the sheets 31, 32 and 33 and secure these sheets together. The welds will be staggered in the manner hereinbefore described.

It will be understood that any desired number of sheets may be assembled into the laminated sheet metal structure and the thickness of the individual sheets may be varied considerably.

It will be understood that considerable variations may be made with respect to the shape of the sheets or plates, the spacing of the welds and the type of metal used in the sheets or plates without departing from the invention. Therefore, the above described applications of the method should be considered as illustrative only and not as limiting the scope of the claims.

I claim:

1. A method of making a laminated sheet metal structure comprising spot welding a pair of metal sheets together at spaced apart points, applying a third sheet of metal to one surface of said pair, applying an electrode having a relatively extended work-contacting face to the opposite surface of said pair of sheets and an electrode having a small face to said third sheet, pressing said electrodes tightly against said sheets, and spot welding said third sheet to the next adjacent sheet only and at points out of alignment with the welds of the first pair of sheets.

2. A method of making a laminated sheet metal structure comprising spot welding a pair of metal sheets, at least one of which is corrugated, together at spaced apart points to form a composite structure having passages extending therethrough, placing electrically conductive members in certain of said passages in electrical contact with said sheets to effect diffusion of the current passing through said structure to one of a pair of welding electrodes positioned in contact with one face of said composite structure, thereafter bringing a third metal sheet into contact with a surface of said composite structure opposite said electrode, applying an electrode to said third sheet, pressing said electrodes tightly against said sheets, and spot welding said third sheet to the sheet next adjacent thereto only and at points that are in alignment with said members and are also out of alignment with the welds between the first pair of sheets.

MAURICE PARTIOT.

REFERENCES CITED

The following references are of record in the file of this patent:

UNITED STATES PATENTS

| Number | Name | Date |
| --- | --- | --- |
| 584,120 | Payne et al. | June 8, 1897 |
| 952,877 | Cowper-Coles | Mar. 22, 1910 |
| 1,502,437 | Poberejsky | July 22, 1924 |
| 1,509,384 | Walter | Sept. 23, 1924 |
| 1,842,774 | Barnhart | Jan. 26, 1932 |
| 1,933,484 | Ragsdale | Oct. 31, 1933 |
| 1,995,368 | Sunnen | Mar. 28, 1935 |
| 1,995,484 | Sullivan | Mar. 26, 1935 |
| 2,137,909 | Hagedorn | Nov. 22, 1938 |
| 2,212,481 | Sendzimir | Aug. 20, 1940 |
| 2,233,526 | Hagedorn et al. | Mar. 4, 1941 |
| 2,268,493 | O'Brien | Dec. 30, 1941 |
| 2,284,504 | Wrighton et al. | May 26, 1942 |
| 2,304,976 | Watter | Dec. 15, 1942 |
| 2,324,435 | Smith | July 13, 1943 |
| 2,324,808 | Abbott | July 20, 1943 |

FOREIGN PATENTS

| Number | Country | Date |
| --- | --- | --- |
| 12,984 | Great Britain | Oct. 28, 1885 |
| 429,459 | Great Britain | May 30, 1935 |
| 459,755 | France | Nov. 14, 1913 |

OTHER REFERENCES

Gioliti, "Cementation of Iron and Steel," 1915, page 333, McGraw-Hill Book Co., New York, N. Y.

"Welding Handbook," 1942, page 483, American Welding Society, 33 West 39th Street New York N. Y.